Patented Sept. 8, 1953

2,651,630

UNITED STATES PATENT OFFICE 2,651,630

MERCAPTO AZINE DERIVATIVES

Paul M. Downey, Nitro, W. Va., assignor to Monsanto Chemical Company, St. Louis, Mo., a corporation of Delaware No Drawing. Application October 26, 1951, Serial No. 253,473

11 Claims. (Cl. 260—243)

This invention relates to new and novel compositions of matter. More particularly it relates to hydroxy substituted aliphatic derivatives of mercapto azines of the general formula

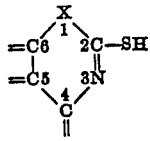

where X is a member of the group consisting of oxygen and sulfur atoms and where at least four of the unsatisfied valences of the adjacent carbon atoms, that is, the carbon atoms in the 4, 5, and 6 positions, of the azine ring are taken up by members of the group consisting of hydrogen atoms and hydrocarbon groups.

The hydrogen atom of the mercapto group is a reactive hydrogen and enters into a variety of reactions for the preparation of useful derivatives. The compounds of this invention include derivatives in which the hydrogen atom of the mercapto group is replaced by a hydroxy substituted aliphatic group which may be represented by the structure —$(R_1O)_nH$ where $R_1$ is an alkylene group, where $n$ is an integer, and where $R_1$ is attached to the azine ring through the mercapto sulfur atom. $R_1$ may also contain a hydroxyl substituent.

The introduction of hydroxy substituted aliphatic groups may be readily effected by condensing a mercapto azine of the above described general formula with compounds such as ethylene oxide, propylene oxide, glycide, epichlorhydrin, trimethylene chlorhydrin, glycerol alpha chlorhydrin, glycol, glycerine, polyglycerine, and the like. Two or more of these reactive compounds may also be caused to react consecutively. The condensation is advantageously carried out in the presence of alkaline reacting agents or nickel sulfate as catalysts.

As exemplary of the mercapto azines which react with the above compounds to form hydroxy substituted aliphatic derivatives possessing useful properties are 2-mercapto-4,6,6-trimethyl meta-thiazine, 2-mercapto-6-methyl-4,6-diethyl meta-thiazine, 2-mercapto-6-methyl-4,6-dipropyl meta-thiazine, 2-mercapto-dihydro meta-thiazine, 2-mercapto-6-methyl-dihydro meta-thiazine, 2-mercapto-6,6-dimethyl-dihydro meta-thiazine, 2-mercapto-4,5,6-trimethyl-dihydro meta-thiazine, and like mercapto meta-thiazines described in U. S. Patent 2,440,095.

Further examples of mercapto azines which readily react with ethylene oxide and the like to form useful compounds are those described in U. S. Patent 2,086,186, as for example 2-mercapto-3,1,4-benzothiazine

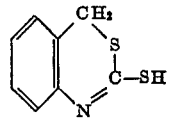

2-mercapto-4,4-dimethyl-3,1,4-benzothiazine, 2-mercapto-3,1,4-benzoxazine

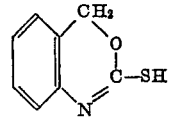

2-mercapto-4,4-dimethyl - 3,1,4 - benzoxazine, 2-mercapto-peri-naphtho-meta-oxazine

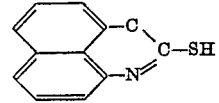

and also the mercaptospirothiazine compounds, as for example, 2-mercaptospiro-5,6,7,8-tetrahydro(1,3,4-benzothiazine-4,1'-cyclohexane

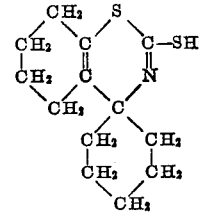

and other like mercapto azines which possess a mercapto group attached to a carbon atom which is in turn attached by its other three valences to one atom of nitrogen and one atom of a member of Group VI of the Periodic Table, as for example, sulfur and oxygen.

As exemplary of the preparation of these new compounds the following is illustrative but in nowise is to be considered limitative thereof.

*Example 1*

22.5 parts by weight (substantially 0.13 mole) of 2-mercapto-4,6,6-trimethyl meta-thiazine and 0.2 part by weight of powdered potassium hydroxide was charged into a glass or glass-lined reaction vessel of suitable capacity and the gross weight recorded. The reactor was fitted with a thermometer together with a gas inlet tube and distributor and with an outlet tube which led to a trap, then to a water trap and finally to a vent.

The inlet tube was connected to a cylinder of ethylene oxide, the connection being made so that the gas passed first into a trap. Between the trap and reactor a manometer was inserted so that the rate of flow into the reactor could be determined. The reactor was surrounded by a wax bath or other heating element and gradually heated. When the bath temperature was about 120° C. and the contents of the reactor at less than 113° C., addition of ethylene oxide was begun. The flow was so adjusted that essentially complete absorption took place as determined by the absence of bubbles through the water trap on the vent side. Rapid absorption of ethylene oxide took place and an exothermic reaction set in. The temperature within the reactor rose to about 151° C. after 45 minutes although the bath temperature was 109–121° C. The absorption rate then began to decline somewhat so the temperature of the heating bath was raised to 140° C. Absorption was again quite rapid and the addition of ethylene oxide was continued for about 5½ hours while heating at 140° C. The temperature of the contents of the reactor was 149–151° C. during this period. The addition of ethylene oxide was then discontinued and the reactor cooled. The total gain in weight was 28.3 parts or 4.95 moles of ethylene oxide per mole of thiazine. The product was a heavy viscous brown oil soluble in dilute hydrochloric acid.

*Example 2*

23.4 parts by weight of the product of Example 1 was charged into the reactor. This corresponds to about 10.3 parts by weight of the meta-thiazine and 13.1 parts by weight of ethylene oxide. The heating bath was raised to about 140° C. at which point the temperature of the reaction mixture was about 115° C. and addition of ethylene oxide commenced. After 4 hours heating at a bath temperature of 140–145° C. and a reactor temperature of 137–151° C., during which period addition of ethylene oxide was continued, 18.9 parts by weight had been absorbed. The rate of ethylene oxide addition was adjusted so that there was no substantial loss through venting of unreacted gas. The product was a mobile dark red-brown liquid soluble in hydrochloric acid. It contained approximately 12.2 molecular proportions of ethylene oxide per mole of the meta-thiazine.

*Example 3*

Into the reactor described in the first example there was charged 25 parts by weight of 2-mercapto-4,6,6-trimethyl meta-thiazine together with 0.2 part by weight of powdered potassium hydroxide. The flow of ethylene oxide into the reactor was started when the bath temperature reached 106° C. at which time the contents of the reactor were at 95° C. Although the meta-thiazine was not completely liquefied, gradual absorption took place and the temperature gradually rose through the exothermic reaction. At 128° C. absorption became rapid although the bath temperature remained at 106° C. for 37 minutes. The temperature of the heating bath was gradually raised from 106° C. to 131° C. over a period of 2 hours during which addition of ethylene oxide was continued and the temperature of the reaction mix rose from 128° C. to 140° C. In this way approximately 11.8 parts by weight of ethylene oxide was absorbed corresponding to 1.85 molecular proportions of ethylene oxide per mole of meta-thiazine. The product was a reddish brown viscous liquid.

*Example 4*

Substantially 37 parts by weight of the product of Example 3 was charged into the reactor and ethylene oxide gradually introduced when the temperature of the reaction reached 97° C. The temperature of the bath was gradually raised from 106° C. to 127° C. over a period of an hour, the reaction temperature reaching 129° C. Absorption of ethylene oxide was rapid. Heating and addition of ethylene oxide were continued for a period of about 2½ hours at 127–136° C. during which the temperature of the reaction mixture varied from 129° to 142° C. The gain in weight was 11.9 parts. Thus, the product contained a total of 23.7 parts by weight of ethylene oxide or 3.75 molecular proportions per mole of the meta-thiazine.

*Example 5A*

25.2 parts by weight of the product of Example 4 were charged into the reactor described in the first example. The heating bath was raised to 136° C. and the flow of ethylene oxide started when the contents of the reactor reached 92° C. The temperature of the reactor rose rapidly to 138° C. in 15 minutes. The heating and addition of ethylene oxide were continued for about 3¾ hours over which period the contents of the reactor were at 138°–141° C. The gain in weight was 10 parts corresponding to 6.79 moles of ethylene oxide per mole of the meta-thiazine.

*Example 5B*

The contents of the reactor were again heated and addition of ethylene oxide started when the temperature within the reactor was 92° C. Over a period of 35 minutes the bath temperature was raised to 134° C. Rapid absorption of ethylene oxide took place. Heating and addition of ethylene oxide were continued for 90 minutes, the reaction temperature varying from 135° C. to 142° C. An additional 2.4 parts by weight of ethylene oxide were absorbed. The resulting product was a brown liquid soluble in dilute hydrochloric acid which contained approximately 7.52 molecular proportions of ethylene oxide per mole of meta-thiazine.

*Example 6*

Substantially 25.2 parts by weight of the product of Example 5B was charged into the reactor described in the first example. The addition of ethylene oxide was started when the contents of the reactor reached 114° C. Continued heating and addition of ethylene oxide was continued for 42 minutes at a bath temperature of 145° C. The contents of the reactor were approximately 147° C. The addition of ethylene oxide was then continued for about 12 hours, the temperature of both the bath and contents of the reactor being in the range of 141–153° C. Substantially 5.9 parts by weight of ethylene oxide were absorbed. The resulting product was a brown liquid containing approximately 10.2 molecular proportions per mole of the meta-thiazine. It dissolved without haze in dilute hydrochloric acid.

*Example 7*

The above compounds are obtained by condensing substantially equimolecular proportions of 2-mercapto-4,4,6-trimethyl meta-thiazine and ethylene chlorhydrin in an alkaline medium and then reacting the equimolecular condensation product with ethylene oxide. For example one molecular proportion of 2-mercapto-4,4,6-trimethyl meta-thiazine was dissolved in aqueous sodium hydroxide and one molecular proportion of ethylene chlorhydrin gradually added thereto with stirring at about 95° C. After completion of the reaction the organic layer was separated, washed and dried and the product condensed with ethylene oxide as described in Example 1.

*Example 8*

Propylene oxide reacts similar to ethylene oxide although more slowly. The product of Example 1 was condensed with propylene oxide under the conditions described in Example 2, propylene oxide being substituted for ethylene oxide in this example. Substantially 10 parts by weight propylene oxide were absorbed, the product being a viscous brown liquid.

*Example 9*

Into the reactor described in Example 1 there was charged substantially 22.5 parts by weight of 2-mercapto-4,4,6-trimethyl meta-thiazine and 0.2 part of powdered potassium hydroxide. When the contents of the reactor reached 115° C. propylene oxide was gradually added. The temperature of the bath was gradually raised to 140° C. as the addition of propylene oxide was continued. Approximately 4 molecular proportions were absorbed over a period of about 6 hours. The product was a viscous brown liquid. It may be represented by the structural formula

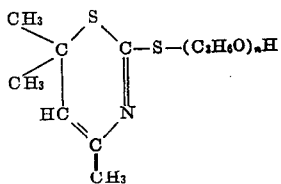

where $n$ is equal to 4.

Compounds having the same empirical formula are prepared by replacing propylene oxide with trimethylene chlorohydrin or with α-propylene chlorohydrin and reacting under the conditions of Example 7.

Similarly to 2-mercapto-4,6,6-trimethyl meta-thiazine, 2-mercapto dihydro meta-thiazine, 2-mercapto-4,4,6-trimethyl dihydro meta-oxazine, 2-mercapto-3,1,4-benzothiazine, and 2-mercapto-3,1,4-benzoxazine react with ethylene oxide, propylene oxide, and the like to produce hydroxy substituted aliphatic derivatives possessing useful properties.

As exemplary of the utility of these new compounds typical examples were employed in a metal pickling process in amounts normally employed under conditions which duplicated, so far as possible those commonly followed in commercial practice and their value as pickling inhibitors determined in the following manner: A test piece of 28 gauge hot rolled tin plate steel stock, approximately 4″ x 3″ in dimension, was immersed in the pickling bath comprising substantially 750 cc. of a water solution containing approximately 6% by weight of 66° Bé. sulfuric acid and 0.03% by weight of one of the new class of compounds above described. The temperature of the bath was maintained at substantially 80° C. The steel test piece after thoroughly cleaning and pre-pickling for a few minutes in the absence of inhibitor and drying was weighed before immersion in the bath, and after 40 minutes pickling the test piece was again weighed, the difference between the two weights representing the metal loss during pickling. The metal loss compared with the metal loss of a similar test piece treated in an analogous manner but without the use of any inhibitor provides a measure of the inhibiting value of the compound employed. The results obtained on testing typical examples of the new class of materials are given in the following table. The metal loss is reported as the average of duplicate determinations.

While $n$ in the table below is a whole number for any given molecule, it is convenient to designate $n$ as a function of the average molecular weight or more particularly the total molecular weight equivalents actually reacted with the mercapto azine. Accordingly, the value of $n$ is the number of mols reacted per mole of mercapto azine and therefore assumes fractional values.

TABLE I

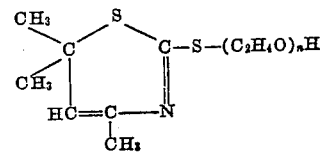

| Value of $n$ | Percent by Weight of Inhibitor | Loss in Weight of Metal in Grams | Remarks |
|---|---|---|---|
| Blank | (¹) | 0.7764 | Plates pitted. |
| 3.7 | 0.03 | 0.0394 | Inhibitor partially soluble. Plates clean. |
| 7.5 | 0.03 | 0.0236 | Inhibitors completely soluble in hot pickling bath at 80° C. Plates clean and bright. |
| 10.2 | 0.03 | 0.0146 | |
| 12.2 | 0.03 | 0.0120 | |

¹ No inhibitor.

It is obvious that the new compounds possess excellent inhibiting efficiency and effect a great saving in metal. While in pickling processes the new compositions wherein $n$ is one possess inhibiting properties, it has been found in general that the preferred value of $n$ is within the range of 5–30. Compositions wherein $n$ is approximately ten have been found both efficient and economical.

The new compositions wherein $n$ is approximately thirty are slightly soluble in water and possess detergent properties. Further the new materials wherein $n$ is greater than twenty may be used in non-aqueous systems as emulsifiers or wetters.

While the invention has been illustrated by reference to a number of specific embodiments of the invention, it will be apparent that many variations may be made from the specific procedures described and from the particular compounds, reacting ingredients and conditions, without departing from the spirit or scope of the invention.

This application is a continuation-in-part of application Serial No. 87,340, now abandoned, filed April 13, 1949.

What is claimed is:

1. As a new composition of matter a compound of the structure R—S—($R_1$O)$_n$H where R is selected from a group consisting of 2-meta-thiazine and 2-meta-oxazine radicals containing at least 4 but less than 14 carbon atoms and hydrogen in addition to the hetero atoms, $R_1$ is a short chain alkyl group and $n$ is an integer at least 3 but not more than 30.

2. As a new composition of matter a compound of the structure

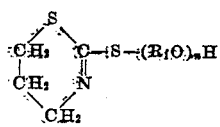

where $R_1$ is an alkylene group containing less than four carbon atoms and where $n$ is an integer at least 3 but not more than 30.

3. As a new composition of matter a compound of the structure

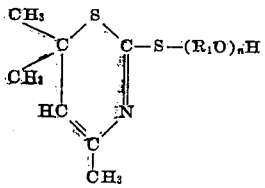

where $R_1$ is an alkylene group containing less than four carbon atoms and where $n$ is an integer at least 3 but not more than 30.

4. As a new composition of matter a compound of the structure

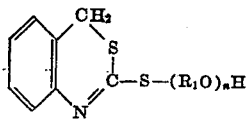

where $R_1$ is an alkylene group containing less than four carbon atoms and where $n$ is an integer at least 3 but not more than 30.

5. As a new composition of matter a compound of the structure

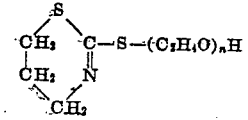

where $n$ is an integer from 5 to 30.

6. As a new composition of matter a compound of the structure

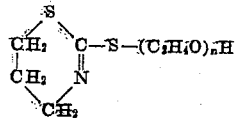

where $n$ is approximately 10.

7. As a new composition of matter a compound of the structure

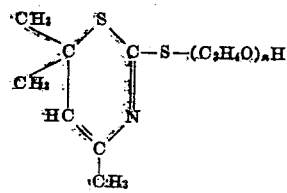

where $n$ is an integer from 5 to 30.

8. As a new composition of matter a compound of the structure

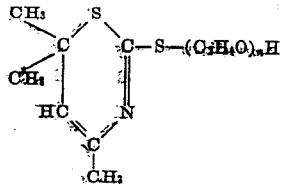

where $n$ is approximately 10.

9. As a new composition of matter a compound of the structure

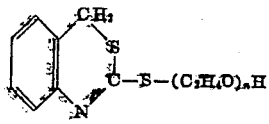

where $n$ is an integer from 5 to 30.

10. As a new composition of matter a compound of the structure

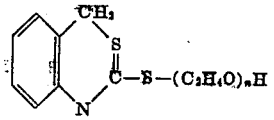

where $n$ is approximately 10.

11. As a new composition of matter a 4,6,6,-trialkyl-2-mercapto meta-thiazine wherein the hydrogen atom of the mercapto group is replaced by the grouping—$(R_1O)_nH$ where $R_1$ is an alkylene group containing less than four carbon atoms and where $n$ is an integer at least 3 but not more than 30.

PAUL M. DOWNEY.

No references cited.